June 19, 1962 W. L. ELLIOTT 3,039,163
HANDLE CUTTING MACHINE
Filed June 5, 1957 4 Sheets-Sheet 1

INVENTOR.
Walter L. Elliott
BY
Webb, Mackey & Burden
HIS ATTORNEYS

INVENTOR.
Walter L. Elliott
BY
Webb, Mackey & Burdea
HIS ATTORNEYS

INVENTOR.
Walter L. Elliott

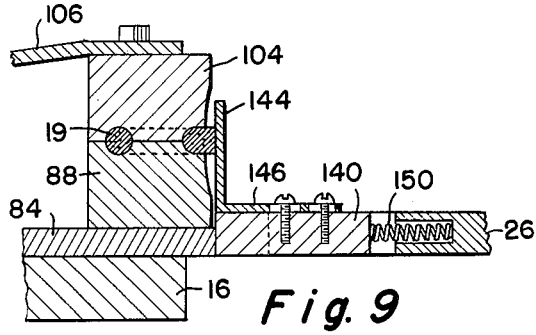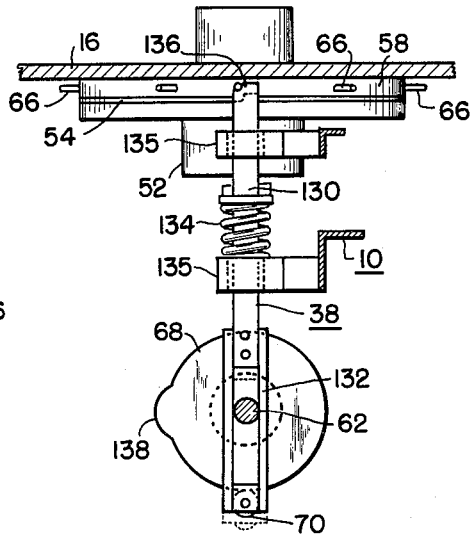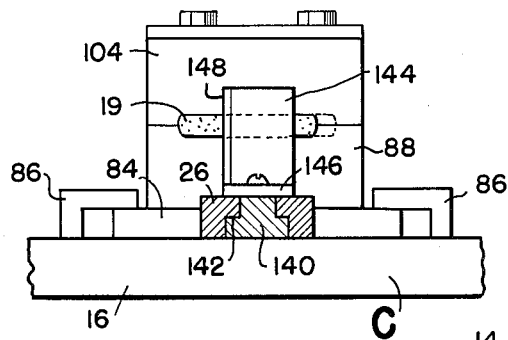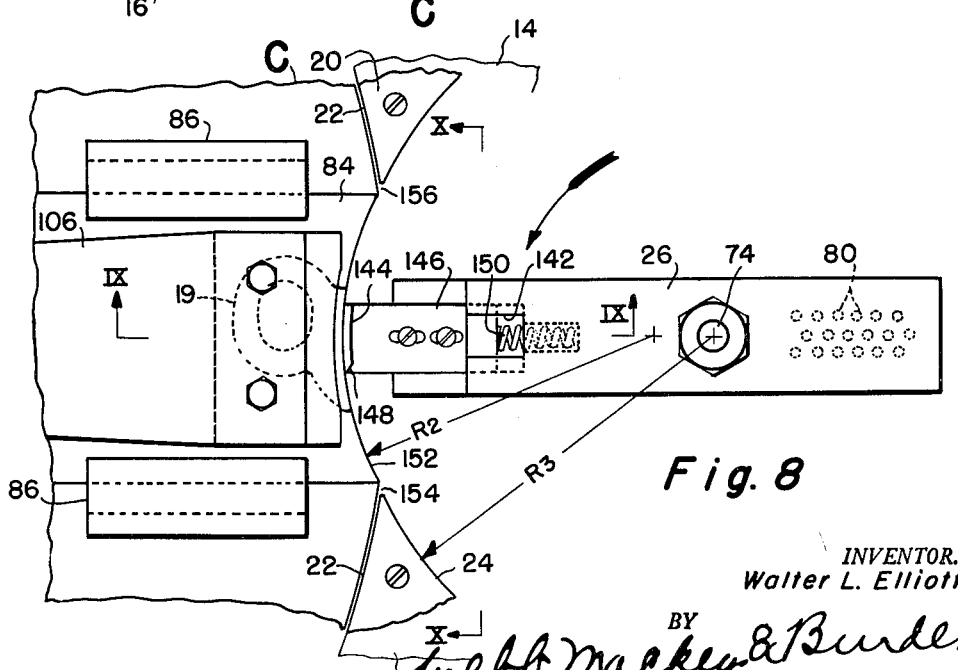
INVENTOR.
Walter L. Elliott

United States Patent Office 3,039,163
Patented June 19, 1962

3,039,163
HANDLE CUTTING MACHINE
Walter L. Elliott, East Liverpool, Ohio, assignor to The Taylor, Smith & Taylor Company, East Liverpool, Ohio, a corporation of Ohio
Filed June 5, 1957, Ser. No. 663,779
13 Claims. (Cl. 25—22)

This application relates to the manufacture of preformed handles for attachment to earthenware, primarily cups. More particularly, it relates to a machine for performing an accurate finish cut on the attachment end of such a handle to insure conformity with the precise curvature of the ware surface to which it is to be attached.

Briefly, the general practice in making the handle parts on cup ware consists of a preforming operation by which they are initially cast in a mold shaped to form a plurality of the handle parts and having a common runner or sprues connecting them, the sprue connected to each handle part being at the cup side of the handle. The mold is next taken apart and each handle, while still in the green state, is broken away from the sprue and then trimmed or cut away on an arc to complete the shaping thereof adjacent the fracture line in order to fit and adhere to the corresponding cup body when pressed against the latter. An adhesive slip of wet clay material forms the necessary bond to stick the handle and, following this union of the handle to a cup body, the cup is removed to a drying operation and then fired.

While tea and coffee cups vary widely in their external surface shape, the portion to which the handle is attached ordinarily has curvature in the longitudinal plane of the cup. A machine according to this invention cuts a corresponding curvature in the handle surface, carrying a cutter which revolves about a fixed axis and which has a substantially straight cutting edge elongated in the direction of that axis. A cam track disposed so as to close upon itself about said axis constantly guides the cutter in its path of revolution and one of the parts forming a minor portion of that cam track is generated with the identical concave curvature as the cup template which by design may or may not have a constant radius in that general area.

The part forming the major portion of the cutter cam track of this invention is fixed with respect to a rotary or turntable provided on the machine and a ring of identical ones of the minor cam track parts is carried by that table so as to mate in succession with the major part when the table stops in each indexed position. I provide fixtures which are supported on those parts and which are adapted to hold the handles on the periphery of the path of the cutting stroke and as each minor cam part is indexed, the handle is trimmed or cut away precisely according to the individual cam part thereunder. Thus the trimmed product of my machine depends entirely upon the individual cam parts selected and they can be substituted for and varied at will to change the cut without necessitating adjustment or changes to the cutter itself. The cut will curve with a constant radius or with a varying radius or will follow a straight line for all or a substantial portion thereof according to the generated cam profile.

According to a feature of this invention a novel indexing mechanism is provided for the foregoing table, employing a constantly rotating slip drive connection thereto and a trippable stop member to stop the table at indexed positions and being tripped to periodically release that table to rotate under power for the next part of a revolution. A further feature resides in an interposed pair of clutch hubs which form the noted slip drive connection and which include a friction disc clamped by gravity therebetween so as to cause one hub to move with the other at or below a predetermined resistance torque and to yield with effective slippage in accommodating relative rotation whenever that hub is forcibly stopped by the indexing mechanism.

Further features, objects, and advantages will either be specifically pointed out or become apparent when for a better understanding of the invention, reference is made to the following description taken in conjunction with the accompanying drawings which show a preferred embodiment thereof and in which:

FIGURE 7 is a side elevational view taken along the section lines VII—VII of FIGURE 3;

FIGURE 8 is an enlarged view of a portion of FIGURE 1; and,

FIGURES 9 and 10 are longitudinal sectional and transverse sectional views taken along the lines IX—IX and X—X of FIGURE 8.

Figure 1:
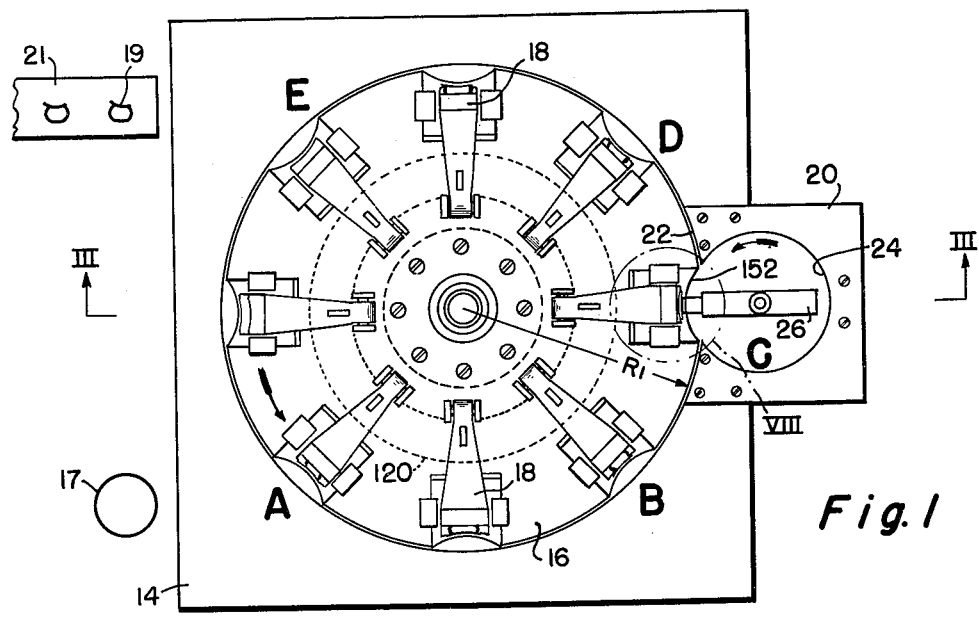
FIGURES 1 and 2 are top plan and front elevational views of my handle cutting machine.
Figure 2:
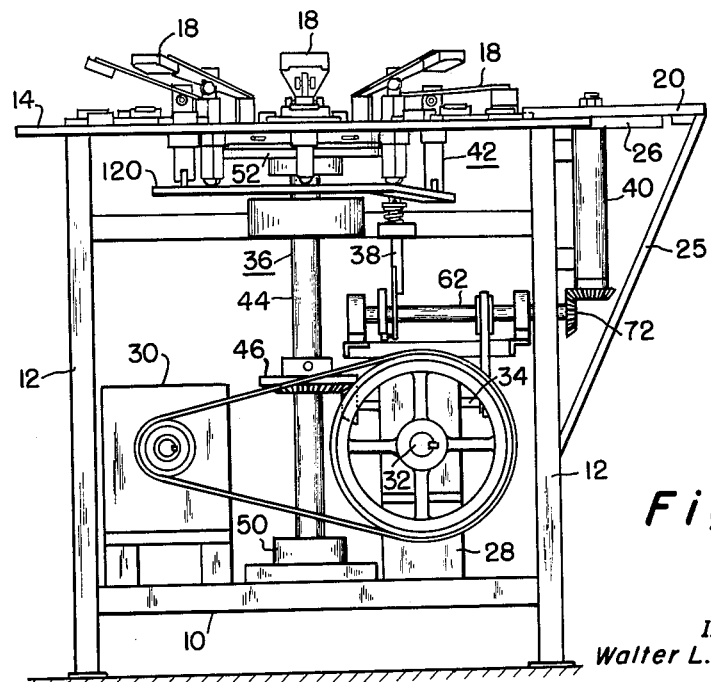

In FIGURES 1 and 2, the present handle cutting machine includes a generally upright square frame 10 having legs 12 respectively at the four corners thereof. The frame 10 carries a square shaped stationary top 14 surrounding a circular indexing turntable 16 which is coplanar therewith. The turntable 16 forms a traveling carrier for eight spaced sets of fixtures 18 which are mounted to revolve therewith at the periphery and which in brief transfer green preformed handles from a loading station A adjacent a pile 17 of the handles, through a clamping station B to a cutting station C for trimming or cutting away the attachment end of the handle, the table rotation being counterclockwise as indicated by the arrow of FIGURE 1. The trimmed handles are unclamped at station D for unloading at the station E. At this station the unloading operator places the trimmed handles 19 on a conveyor 21 for removal to a handle sticking operation where a machine of the type generally as shown in the copending Elliott application, Serial No. 663,626, filed June 5, 1957, may be used for automatically affixing the handles to a cup or other hollow earthenware body.

A small, generally square plate 20 is clamped by fasteners atop the large square top 14 and is rigidified at its overhanging edge by means of one or more diagonal braces 25. The inner side of the plate 20 is concavely relieved at 22 with a generated profile having a radius equal to the radius R1 of the table 16 so as to match the path of revolution of the fixtures 18 thereon for proper clearance as the table rotates. The plate 20 has a circularly relieved portion 24 intersecting it at one margin so as to interrupt the concavely relieved portion 22 thereof and defining a confining area in which a cutter arm 26 for carrying a cutter is mounted to turn in the fixed plane of the plate.

At the lower portion, the machine frame 10 carries a drive gear box 28 and an electric motor 30 adjacent thereto which through a sheave and belt connection continuously turns an input shaft 32 journaled in the box 28. The input shaft 32 is internally connected through suitable reduction gearing to an output shaft 34 also journaled in the gear box 28 and connected to provide a common drive to a table turning mechanism 36, a table indexing mechanism 38, and a drive mechanism 40 for rotating the cutter arm 26. A fixture camming mechanism 42 operates automatically with motion of the table 16 to clamp and to release handles 19 from the fixtures 18.

Figure 3:
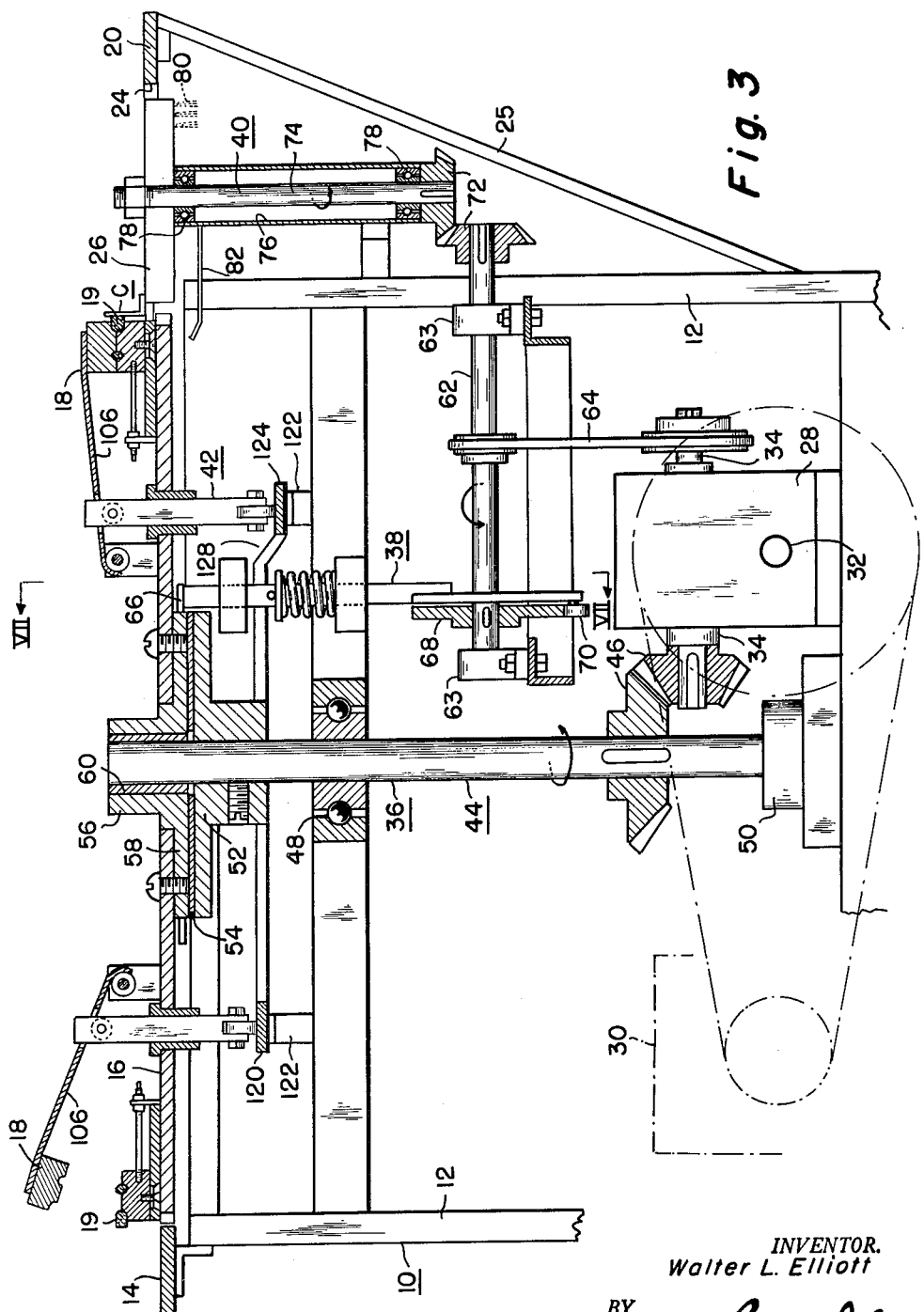
FIGURE 3 is a longitudinal view in side elevation taken along the lines III—III of FIGURE 1.

In FIGURE 3 the table turning mechanism 36 has a vertical supporting shaft member which forms the drive spindle 44 for the table 16 and which is constantly rotatable under power through a set of meshing bevel gears 46 driven by the output shaft 34. The drive spindle 44 is held upright by means of a ball bearing 48 fixed in the frame 10 and has its lower end supported with a rotating fit in a thrust bearing 50 fixed in the frame. The upstanding end of the spindle 44 carries a flanged hub 52 which is provided with a friction disc 54 of clutch lining material that may preferably be made fast to the face of the flange. The table 16 presents a confronting upper hub 56 provided with an attachment flange 58 bolted centrally thereto and which is of the same diameter as the friction disc 54 so as to clamp against it under the weight of the table 16 and thus support the load thereof. A bearing bushing 60 within the table hub 56 is supported with a rotating fit on the drive spindle 44 to hold the table centered during relative rotation between the hubs 52 and 56.

The wear surface which the friction disc 54 presents at its interface of engagement with the confronting flange 58 enables the shaft connected hub 52 to turn with or without the other hub 56 and the table connected flange 58 thereon. When released, the table 16 is instantly set in motion and continues to move with the hub 52 until forcibly stopped. The novel gravity clamped action produced between the flange 58 and the disc 54 resists relative rotation with a frictional force proportioned to a constant clamping pressure which is due solely to the weight of the load carried by the hub 56. Thus the mass of the intermittently moved table is used in a major factor in overcoming its own inertia.

A horizontal jack shaft 62 set in frame bearings 63 is connected through a V-belt 64 to the output shaft 34 of the gear box 28 and forms a drive therefrom common to the cutter drive mechanism 40 and to the indexing mechanism 38 which controls fixed pins 66 protruding from the flange on the table hub 56. The jack shaft 62 has a cam disc 68 affixed to one end thereof by which it operates the indexing mechanism 38 through a follower roller 70 carried by the latter. At the opposite end, the jack shaft 62 is connected through a set of bevel gears 72 to a cutter spindle 74 which is vertically supported with a rotating fit in a tubular spindle housing 76 by means of spaced ball bearings 78.

The cutter arm 26 is fast to the upper end of the spindle 74 and carries a set of depending bristles 80 on the under side of one end portion which sweep by a scrap collecting tray 82 to brush accumulated scraps of trimmed clay therefrom down a chute (not shown) for disposition in a suitable receptacle. The tray 82 is fixed in the frame slightly below the path of the fixtures 18 so as to protrude slightly thereunder and underlie at least a portion of the circularly relieved area of the fixed plate 20.

In each of the holder mechanisms 18 according to FIGURES 3–6, a cam guide plate 84 supported by the table 16 is secured thereto by means of a pair of side brackets 86 and carries a handle supporting die 88. One or more hold-down bolts 90 each passing through a longitudinal guide slot 92 in the plate 84 are threaded into the die 88 (FIGURE 6) and two rods 94 have a threaded connection at one end to the die 88 to slide it to longitudinally adjusted positions above the plate 84 adjacent a circular cut-out 96 (FIGURE 4) in the edge of the table 16.

At the opposite end each rod 94 has a square head 98 to receive a tool and a threaded portion passing through an upstanding flange 100 fast to the plate 84 and adjustably anchored in opening therein by means of clamp nuts 102. The handle supporting die 88 has the usual dowel and socket connections for alignmnet with a gripper die 104 thereabove which clamps a handle 19 within mating recesses provided in the face of the dies. A vertically swinging arm 106 made of sheet metal has its radially outer end bolted through longitudinal adjustment slots 107 to the die 104 for moving it into proper registry to grip and to release the handles.

Figure 4:
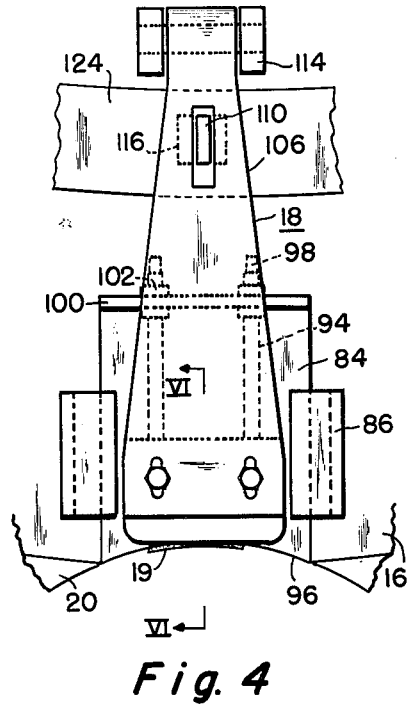
FIGURES 4 and 5 are plan and side elevational views of one of the handle holder fixtures.
Figure 5:
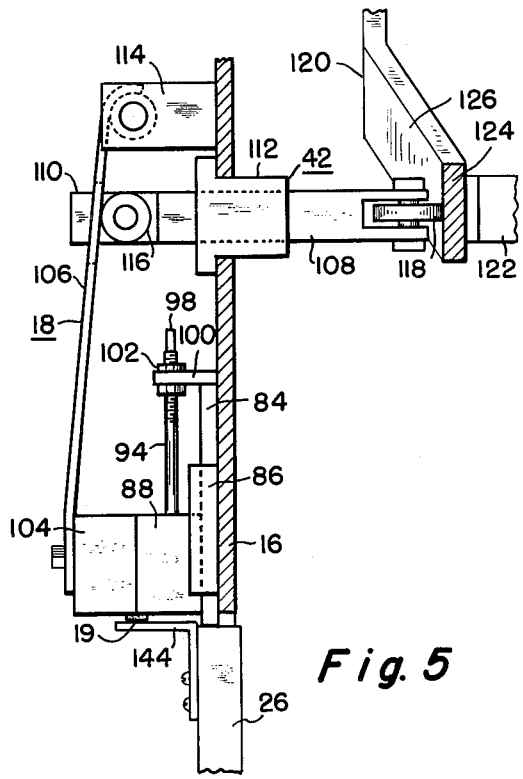
Figure 6:
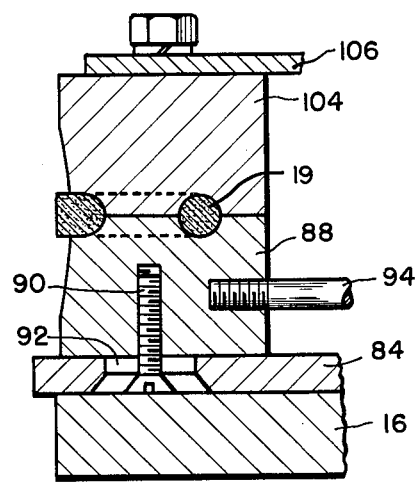
FIGURE 6 is a detail taken along the lines VI—VI of FIGURE 4.

The camming mechanism 42 to pivot the arms 106 between their closed position shown at the right as viewed in FIGURE 3 and their open position shown at the left as viewed in FIGURE 3 includes a square bar 108 having a pin and slot connection 110 with the arm 106 (FIGURES 4 and 5). A complementary slide box 112 which fits about the square bar 108 is secured to the table 16 at a point adjacent a bracket 114 to which the arm 106 is pivotally connected. At the upper end the square bar 108 carries a pair of side rollers 116 in contact with the arm 106 to cam it upwardly and downwardly and at the lower end, the bar 108 carries another roller 118 riding a fixed circular cam rail which is primarily flat for providing a dwell period for its major portion 120. A series of pedestal brackets 122 supports the circular cam rail upon the frame 10 in a fixed concentric position and in one segment, the rail has a flat dip portion 124 offset from the plane thereof and joined to the major portion 120 by means of a sloping ramp 126 (FIGURE 5) at one side and an ascending flank 128 (FIGURE 3) at the other. The dip 124 measures slightly in excess of 30° in arcuate length, whereas the ramp 126 and the flank 128 are each slightly less than 30° making it evident that the major portion 120 accounts for approximately 270° of the full circle length of the cam rail. The dip 124 squarely confronts the cutter station C between the clamping and unclamping stations B and D of FIGURE 1.

In FIGURE 7, the indexing mechanism 38 includes a square stop bar 130 having a follower frame 132 at the lower end which straddles the jack shaft 62 and which carries the roller follower 70. A return spring 134 engaging the stop bar 130 biases it upwardly in a pair of vertically spaced guide bearings 135 which are affixed to the frame 10. The upper corner of the bar 130 is relieved to provide a trip shoulder 136 which is engageable with the individual protruding pins 66 on the hub flange 58 for the table 16.

The cam disc 68 provides a dwell period for its major portion but once each revolution a round pointed nose 138 thereon cams the follower roller 70 downwardly for an instant. Thus the stop bar 130 momentarily occupies the tripped position shown in dotted lines enabling one pin 66 to clear the trip shoulder 136 which immediately resets to await engagement with the next pin.

In FIGURES 8, 9, and 10, the cutter arm 26 carries a spring-loaded, cutter supporting slide 140 fitting in a slot 142 which is T-shaped in cross-section and which is formed in the end of the arm 26 opposite from the set of bristles 80. A cutter 144 with a cylindrically curved blade is integral with an attachment flange 146 which has a set of fasteners connecting it to support the slide 140 for radial movement in the plane of the cutter arm 26. The cutter 144 has a substantially straight cutting edge 148 for trimming the individual handles 19 and it is guided in conformity with the cam track due to the bias of a coil spring 150 which at one end seats against a bottom of a socket in the arm 26 and which at the other end presses against the inner end of the slide 140. The spring 150 once per revolution thus forces the slide 140 to follow radially into the laterally offset template in its path provided by the concavely relieved cam track portion 152 formed on the guide plate 84. The radius of curvature R2 for the portion 152 is smaller than the radius R3 indicated for the circular relieved portion 24 of the plate 20 and the arcuate extent of the latter accounts for the major portion of the cam track, notably approximately 320° in arcuate length.

In locating each plate 84, the installer adjusts it to make the outer corners thereof line up with the sharp corners of intersection between the surfaces 22 and 24 of the plate 20, thereby defining slight gaps 154 and 156 in the cam track which are considerably narrower than the end of the slide 140 and over which the slide 140 smoothly rides as it revolves. The cutter arm 26 turns continuously, rotating one full revolution for each individual fixture 18 on the table 16; i.e., eight times per revolution of the intermittently rotated indexing table 16.

In operation of the machine of foregoing FIGURES 1–10, the common jack shaft 62 (FIGURE 3) locks the cam disc 68 and the cutter drive spindle 74 for synchronous rotation in timed relation as follows. The cam nose 138 (FIGURE 7) reaches the bottom-most point in its travel slightly after the cutter 144 has cleared the gap 154 (FIGURE 8) and, in so doing, it momentarily trips the trip shoulder 136 to release the fixed pin 66 above it on the table 16. The bevel gearing 46 of FIGURE 3 has a properly selected gear ratio enabling the momentarily released table 16 to be set in motion and drag for ⅛ of a revolution with the friction disc 54 and then reengage the next pin 66 and stabilize with a substantially uniform pressure thereagainst well prior to the cutter blade 144 reaching the gap 156 of FIGURE 8. Within this period, therefore, the next plate 84 will have reindexed with the fixed plate 20 and consequently enables the cutter to operate upon a new handle 19 during the next cutting stroke on the template between the gaps 156 and 154. This stroke exactly conforms to the portion 152 of the cam track and other plates can be substituted for the exchangeable plate 84 having entirely different curvature corresponding to templates for various kinds of cups and hollow earthenware articles. The indexing operation occurs only during the interval that the cutter is traveling the noncutting part of its path and during this interval the fixture 18 at the clamping station B is being closed by action of the ramp 126 in the cam rail of FIGURE 5 and simultaneously the fixture at station D of FIGURE 1 is vertically aligned with the cam rail flank 128 of FIGURE 3 so as to undergo unclamping.

The present machine readily produces 120 dozen handles per hour which corresponds to an average of three revolutions of the turntable occurring per minute and this rate is easily recognized as several times that of rates commonly yielded in a handle production line.

Variations within the spirit and scope of the invention described are equally comprehended by the foregoing description.

I claim:

1. In a handle cutting machine having an indexing table provided with handle holding fixtures thereon, the combination of a fixed plate having a concavely relieved side which matches the path of revolution of said fixtures for proper clearance and having a relieved inner section intersecting said side, a cutter supporting means mounted to turn in the plane of the fixed plate within the area of the relieved inner section thereof and carrying said cutter, and a plate for attaching one of said fixtures to said indexing table and having a concavely relieved side which in one indexed position of the table complements the relieved inner section of the fixed plate and together therewith defines a guide track by which the cutter supporting means rides on said plates.

2. In a handle cutting machine having an indexing table provided with handle holding fixtures thereon, the combination of a fixed plate having a concavely relieved side which matches the path of revolution of said fixtures for proper clearance and having a relieved inner section intersecting said side, a cutter support mounted to turn in the plane of the fixed plate within the area of the relieved inner section thereof, a plate for attaching one of said fixtures to said indexing table and having a concavely relieved side which in one indexed position of the table complements the relieved inner section of the fixed plate and together therewith defines a guide track by which the cutter support rides on said plate, said plates further characterized wherein the relieved side of said fixture attaching plate has a smaller radius of curvature than the inner section of said fixed plate, and a cutter carried by said support and biased outwardly so as to ride from the fixed plate into the lateral offset provided in its path due to the smaller radius of said fixture attaching plate.

3. In a handle cutting machine having means carrying individual handles and for indexing same to and from a cutting station, and means carrying a cutter at said station and for rotating same in an endless closed path thereat to trim handle projections carried by said handle carrying means; the combinatin therewith, of a main vertical shaft centrally supporting said handle carrying means, a second vertical shaft supporting said cutter carrying means centrally of said closed path, drive means common to said shafts constantly rotating them both, a trippable brake engaged with the carrying means supported by one shaft for exerting braking solely against that means during rotation and actuable by and at repetitive points during regular rotation of said common drive means so as to trip and release said carrier means for unrestrained rotation with said one shaft which supports same, the other of said shafts being fast to the carrying means supported thereby, and a slip joint connection between said one shaft and said carrying means supported thereby to accommodate braking of the latter by said brake in the above-described manner.

4. Apparatus as described supporting thereon, in combination, a horizontally disposed table member and a horizontally disposed cam plate member supported adjacent one another in cooperating relation substantially in one plane, said pair of members consisting of substantially closed geometric figures with arcuately relieved portions therein intersecting their edges so as to provide each of same with an interruption of the area thereabout, means for relatively revolving one of said members in their common plane to match just said portions of the table member and of the plate member whereby their relieved areas are brought into registry with one another, a cam guided cutter mounted for continuous rotation in said relieved area of the cam plate member so as to track, during progress of rotation, upon said arcuate portion of one of the members and at least partly upon said arcuate portion of the other, and an appendage-carrying fixture supported on said table member adjacent an arcuate portion thereof as aforesaid and adapted to project an excess part of the appendage which it carries into the path of the cutter rotating therepast.

5. Apparatus according to claim 4 wherein a plurality of the above defined relieved areas are cut-out portions present in each of said members, one cut-out portion in said cam plate member defining a circular arc whereas said table member constitutes the revolving member and being complementally circular so that the former arc matches smoothly therewith without interference, and another cut-out portion in said cam plate member defining a circular arc enabling the cutter to track smoothly thereon.

6. A handle cutting machine with a cutting station comprising a first plate which defines part of an endless path, a trimming cutter adapted to repetitively revolve in a closed path in conformity with said endless first plate path, at one point of which path the cutter cuts handles, a table positioned to support the handles with their portions requiring trimming successively projecting into the line of the cutter so that the cutter in its path of revolution makes a passing stroke at one point adjacent to each handle, there being cam means provided on said table at a point adjacent to and parallel with each handle, said closed path being defined by said cam means and the endless first plate path, and operating means comprising a constantly rotatable power shaft having a slip drive connection to said table for imparting relative turning motion between the table and the cutter so as to advance said handles in rotation to the cutting station while the cutter is executing the balance of each path of revolution ready for the next passing stroke, said operating means further comprising releasable trip means operatively related to engage with and hold said table against rotation, means supporting said table and said trip means in the operative relationship aforesaid, said trip means actuatable for periodically releasing said table for conjoint movement with said power shaft, and a drive common to said cutter and to said trip means for driving the former and for actuating the latter in timed relation to the cutter so as to insure that the passing portion in each path of revolution of the cutter is accomplished prior to release of the table.

7. An indexed handle cutting machine comprising a handle holding fixture, power-shaft driven means operatively related with re-indexing mechanism for supporting said handle holding fixture for movement to and from a cutting station and for re-indexing said fixture on the completion of motion to and from a cutting station, means supporting said driven means and said re-indexing mechanism in the operative relationship with said fixture as aforesaid and including a power shaft, said power shaft having a slip-drive connection to said driven supporting means, a handle cutter at said station, rotating means supporting said handle cutter at said station and for constantly rotating the same whereby the cutter in its path of revolution makes a passing stroke at one point of adjacency to the handles to trim handle projections of each of the handles in rotation carried by said fixture, and operating means to control the handle holding fixture so as to advance said handles in rotation to the cutting station while the cutter is executing the balance of each path of revolution ready for the next passing stroke, said operating means comprising single continuous drive means connected to said power shaft and to said rotary means and to said re-indexing mechanism operable for tripping the latter in timed relation to the handle cutter rotating means so as to insure completion of each passing stroke portion in each path of rotation of the cutter prior to trip-actuation of said re-indexing mechanism.

8. A handle cutting machine having a cutting zone and including a first plate carried thereby within the cutting zone, an adjacent rotatable table of which the edge portions rotate into the cutting zone as said table rotates, a plurality of handle supports; a plurality of other plates on the edge portions of the table so as to rotate therewith and each carrying one of the handle supports aforesaid, said plates mating in sequence one at a time with the first plate so as to form one side of a cam track which for its major portion is located within the first plate, and which completes a closed guide path, and a cutter supported for rotation about a fixed axis within said first plate and having a cam follower which transfers consecutively from within the cam track of the first plate and rides along one of the other of the plates currently completing the closed guide path for performing a cutting stroke of the cutter on a handle carried by the associated handle support.

9. In a handle cutting machine, rotatable handle carrying means comprising a rotatable table having a plurality of support means for supporting individual handles on the table and having means for indexing the table so as to move the support means to and from a cutting station, cutter carrying means carrying a cutter at said cutting station and for rotating said cutter in conformity with an incomplete endless guide path with which the cutter path corresponds, said support means supporting said handles so that they project into the cutter path whereby the cutter trims the handle projections, there being cam means supported on said rotatable handle carrying means which are connected to said support means in parallel with the handles and each of which completes the endless guide path aforesaid, a main vertical shaft centrally supporting said rotatable handle carrying means, a second vertical shaft supporting said cutter carrying means centrally of said endless guide path, drive means common to said shafts for constantly rotating them both, one of said shafts being fast to the carrying means carried thereby, and a slip joint connection between the other shaft and the carrying means supported thereby enabling slippage to be sustained during the table indexing purposes set forth.

10. In a machine for cutting preformed handles for ware, the combination with a handle support, of power drive means, cutter supporting means including a carrier and disposed in operative relationship adjacent said handle support so as to operate therepast and operable by said power drive means for continuous revolving movement about an axis, a bipartite cam track which forms an endless path for the carrier closing on itself, one of the parts of said bipartite cam track comprising a cam track plate operatively related with said cutter supporting means and carried on said machine so as to be connected with the carrier to guide same as it revolves therepast with a cutter, another of said parts comprising an exchangeable curved side carried on said machine which fits in place effectively completing endless path for the carrier closing on itself, there being a support member on said machine common to said handle support and exchangeable curved side and supporting them in fixed parallel relation to one another, said carrier included in said cutter supporting means being slidably mounted to the outer end portion of said cutter supporting means and biased in a direction outwardly into engagement with said cam track, and a cutting element positioned to ride on the carrier of said cutter supporting means so that said element, incident to the carrier engaging and being guided by the exchangeable curved side of said cam track, rides in a curving path past said handle support to cut that curve in a lengthwise direction upon a handle.

11. A mechanism for use with a cutter to remove scraps of material from the terminals of preformed ware handles, the combination of a handle support holding said handles, a first plate in operative relationship adjacent said handle support and having a circularly relieved area, first and second means supporting the handle support and the plate on said apparatus in the operative relationship described, a bipartite cam track which forms an endless path for a cutter arm closing on itself, a cutter arm mounted on said apparatus for rotation in the plane of said bipartite cam track, one of the parts of said bipartite cam track comprising the circularly relieved area of said first plate, cutter carrying means for carrying said cutter in a path past said handle support to remove said scraps from the handles and arranged to ride at the end of the cutter arm in engagement with the bipartite cam track which, for its major portion, follows in conformity with said margin of the circularly relieved area of said plate, another of said parts of said bipartite cam track comprising separate means forming the remaining portion of the track so as to close the cam track on itself, and being in non-circular relation with the circularly relieved area of said first plate, said first supporting means comprising a support member on said machine common to said handle support and said separate means and supporting them in fixed parallel relation to one another, and a scrap collecting tray below said handle support and underlying at least a portion of the circularly relieved area of said plate.

12. A mechanism according to claim 11 wherein said cutter carrying means comprises a spring loaded slide biased outwardly from an end portion of said cutter arm to travel positively engaged upon the bipartite cam track, and means carried by another portion of said cutter arm to brush scraps from the collecting tray contemporaneously with travel of the cutter carrying means.

13. A mechanism for use with a cutter to remove material from the terminals of preformed handles, said apparatus provided with a bipartite cam track defining an endless path forming a guide closing on itself, the improvement comprising a handle support, one of said bipartite cam track parts comprising a first plate disposed in operative relation adjacent said handle support and having a circularly relieved area, first and second means supporting the handle support and the first plate on said apparatus in the operative relationship described, a cutter arm mounted to constantly rotate in the plane of the first plate inside said bipartite cam track, cutter carrying means for carrying said cutter past said handle support to remove said material from the terminals of the handles, and arranged to revolve with the end of said cutter arm along said bipartite cam track which for its major portion follows in conformity with the margin of the circularly relieved area of said first plate, another part of said bipartite cam track comprising separate means on said apparatus forming the remaining portion of said cam track so as to close the cam track on itself, said first supporting means comprising a support member on said machine common to said handle support and to said separate means and supporting them in fixed parallel relation to one another, means on the cutter arm biasing said cutter carrying means into constant engagement with the bipartite cam track as the cutter carrying means revolves with the cutter arm, and power means for effecting constant rotation of said cutter arm.

References Cited in the file of this patent

UNITED STATES PATENTS

| | | |
|---|---|---|
| 2,202,082 | Berkstresser | May 28, 1940 |
| 2,309,726 | Zalewski et al. | Feb. 2, 1943 |
| 2,413,540 | Bloore | Dec. 31, 1946 |
| 2,489,784 | Kerr | Nov. 29, 1949 |
| 2,510,678 | Bower | June 6, 1950 |
| 2,558,318 | Sebell | June 26, 1951 |
| 2,619,701 | Jordan | Dec. 2, 1952 |
| 2,632,223 | Jordan | Mar. 24, 1953 |
| 2,638,653 | Adams | May 19, 1953 |
| 2,810,438 | Stone | Oct. 22, 1957 |
| 2,827,681 | Strasser | Mar. 25, 1958 |

FOREIGN PATENTS

| | | |
|---|---|---|
| 584,582 | Great Britain | Jan. 17, 1947 |